US009625120B2

(12) United States Patent
Sakaguchi et al.

(10) Patent No.: US 9,625,120 B2
(45) Date of Patent: Apr. 18, 2017

(54) WHITE REFLECTIVE FILM FOR EDGE-LIGHT TYPE BACKLIGHT, AND LIQUID CRYSTAL DISPLAY BACKLIGHT USING SAME

(75) Inventors: Yoshihiko Sakaguchi, Otsu (JP); Yuji Kawata, Otsu (JP); Motoyuki Suzuki, Otsu (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 14/006,458

(22) PCT Filed: Mar. 14, 2012

(86) PCT No.: PCT/JP2012/056508
§ 371 (c)(1),
(2), (4) Date: Sep. 20, 2013

(87) PCT Pub. No.: WO2012/132895
PCT Pub. Date: Oct. 4, 2012

(65) Prior Publication Data
US 2014/0009961 A1 Jan. 9, 2014

(30) Foreign Application Priority Data
Mar. 29, 2011 (JP) .................................. 2011-071957

(51) Int. Cl.
*F21V 7/04* (2006.01)
*B29D 11/00* (2006.01)
(Continued)

(52) U.S. Cl.
CPC .......... *F21V 7/04* (2013.01); *B29D 11/00326* (2013.01); *G02B 6/0031* (2013.01);
(Continued)

(58) Field of Classification Search
CPC .. G02B 6/0038; G02B 6/0036; G02B 6/0073; G02B 6/0068; G02B 6/0055; G02F 1/133615
(Continued)

(56) References Cited

U.S. PATENT DOCUMENTS 6,683,720 B2 * 1/2004 Yoshida ............... G02B 5/0221
359/599
2001/0002165 A1 * 5/2001 Shinohara et al. ............. 362/31
(Continued)

FOREIGN PATENT DOCUMENTS

JP 08-262208 A 10/1996
JP 09-197402 A 7/1997
(Continued)

*Primary Examiner* — Julie Bannan
(74) *Attorney, Agent, or Firm* — DLA Piper LLP (US)

(57) ABSTRACT

A white reflective film for an edge light backlight improves the luminance and unevenness therein, avoids uneven close contact with, and scraping of, the light guide plate, and minimizes the crushing of convexes formed on at least one side, even in cases where the reflective film is laid directly over a corrugated chassis designed to house circuitry or the reflective film is used in combination with LEDs. The film satisfies (i) to (iii): (i) a stiffness of 2 to 10 mN·m; (ii) convexes have been formed on at least one face (A), and their maximum height is 5 to 60 μm; (iii) the convexes contain an aromatic polyester.

7 Claims, 2 Drawing Sheets

(51) Int. Cl.
  *G02F 1/1335* (2006.01)
  *F21V 8/00* (2006.01)
  *G02F 1/13* (2006.01)
(52) U.S. Cl.
  CPC ......... *G02B 6/0055* (2013.01); *G02B 6/0065* (2013.01); *G02B 6/0043* (2013.01); *G02F 1/1309* (2013.01); *G02F 1/133615* (2013.01); *G02F 2201/54* (2013.01); *G02F 2203/02* (2013.01)
(58) Field of Classification Search
  USPC ........................................ 362/612, 623, 626
  See application file for complete search history.

(56) References Cited

U.S. PATENT DOCUMENTS

| | | | | |
|---|---|---|---|---|
| 2002/0135996 | A1* | 9/2002 | Suga | 362/31 |
| 2003/0206408 | A1* | 11/2003 | Funamoto et al. | 362/31 |
| 2004/0021810 | A1* | 2/2004 | Kawaguri et al. | 349/113 |
| 2004/0228108 | A1* | 11/2004 | Lee et al. | 362/31 |
| 2007/0048499 | A1* | 3/2007 | Wu et al. | 428/143 |
| 2008/0247175 | A1* | 10/2008 | Yoon et al. | 362/341 |
| 2010/0189959 | A1* | 7/2010 | Sato et al. | 428/143 |
| 2012/0320600 | A1* | 12/2012 | Ohira et al. | 362/296.01 |

FOREIGN PATENT DOCUMENTS

| | | |
|---|---|---|
| JP | 2000-057830 A | 2/2000 |
| JP | 2001-266629 A | 9/2001 |
| JP | 2002-090515 A | 3/2002 |
| JP | 2002-372606 A | 12/2002 |
| JP | 2003-092018 A | 3/2003 |
| JP | 2003-281918 A | 10/2003 |
| JP | 2008-512719 A | 4/2008 |
| JP | 2009-301972 A | 12/2009 |
| JP | 2010-080107 A | 4/2010 |
| WO | 2007/072801 A1 | 6/2007 |
| WO | 2007/088797 A1 | 8/2007 |
| WO | 2011/105295 A1 | 9/2011 |

* cited by examiner

WHITE REFLECTIVE FILM FOR EDGE-LIGHT TYPE BACKLIGHT, AND LIQUID CRYSTAL DISPLAY BACKLIGHT USING SAME

TECHNICAL FIELD

This disclosure relates to a white reflective film aimed at improving unevenness in the luminance of a liquid crystal display backlight. More specifically, the disclosure relates to a white reflective film that may advantageously be used for edge light liquid crystal display (LCD) backlights and planar light sources to illuminate signboards, vending machines, and the like.

BACKGROUND

A liquid crystal display uses a backlight to illuminate liquid crystal cells. Conventionally, backlight design varies according to the type of liquid crystal display, and edge light backlights have been employed for relatively small liquid crystal monitors, while direct backlights have been adopted for relatively large LCD televisions. As a reflective film for such backlights, a porous white film formed with air bubbles is generally used (Japanese Unexamined Patent Publication No. HEI-8-262208). In this regard, a white film deposited with an ultraviolet absorbing layer aimed at preventing yellowish discoloration due to an exposure to ultraviolet light emitted by a cold cathode fluorescent lamp has been proposed (Japanese Unexamined Patent Publication No. 2002-90515). Reflective films in which a layer containing soft beads is deposited on a base layer have also been developed as products particularly suited to use with a prism-shaped light guide plate (Japanese Unexamined Patent Publication No. 2003-92018 and Published Japanese Translation of PCT International Publication JP 2008-512719). Further, reflective films provided with a surface irregularity without the use of beads have been developed for use as reflective films for an edge light backlight (Japanese Unexamined Patent Publication Nos. HEI-9-197402 and 2001-266629).

In recent years, the slimline design trend of LCD televisions has led to the use of an edge light backlight in LCD televisions, and vigorous development efforts on edge light backlights are now underway. At the same time, the use of light emitting diodes (hereinafter abbreviated as "LEDs") as low power-consumption mercury-free light sources is growing.

Unlike notebook computer displays and desktop monitors, televisions are required to provide high luminance, which makes it necessary to deploy a large number of LEDs. This, in turn, has necessitated the production of a chassis from aluminum, a highly heat-conductive material, as a means to efficiently dissipate heat. However, the use of aluminum tends to reduce mechanical strength, and this has given rise to a need to, for instance, give a corrugated shape to the rear chassis 4, as illustrated in FIG. 1, via a drawing process. Such a corrugated shape has also been designed to save space by housing circuitry, etc. in furrow sections for the sake of slimline design.

An edge light backlight requires a light guide plate as an essential optical element. With conventional notebook computers and desktop monitors, light guide plates of up to 25 inches in size are sufficient, but televisions require 30 to 60-inch ones. For this reason, various light guide plates have been developed, including light guide plates with surface convexes, typically an acrylic plate (3 to 4 mm in thickness) on which a circular or dot pattern has been printed, and light guide plates engraved concaves using the laser processing or UV transfer method. A technique to form light guide plates with surface convexes directly from resin pellets via injection molding has also been developed.

However, the development of large thin edge light backlights as described above is associated with some reflective film-related problems, particularly (i) to (v) below:
  (i) Unevenness in luminance caused by uneven close contact between the light guide plate and reflective film.
  (ii) Unevenness in luminance caused by the scraping of the light guide plate by bumps created in the reflective film by localized protrusions present in the rear chassis as a result of defective molding.
  (iii) Unevenness in luminance caused by the scraping of the light guide plate due to friction between the light guide plate and the reflective film during the television vibration test.
  (iv) White spotting (appearance of any visually observable bright spotty areas) caused by uneven close contact between the light guide plate and the reflective film as described in (i) above as a result of the convexes of the light guide plate pressing on the convexes formed on the reflective film, a problem specific to a backlight featuring a light guide plate with convexes.
  (v) White spotting (appearance of any visually observable bright spotty area) caused by the crushing of convexes formed on the reflective film by the convexes of the light guide plate and attachment of the remains of those convexes to the light guide plate, a problem specific to a backlight featuring a light guide plate with convexes.

The reflective films described in JP '018 and JP '719 have some effectiveness in improving the unevenness in luminance caused by the scraping of the light guide plate. However, those films are unable to fully satisfy the level of stiffness and maximum height of convexes required of the LCD television application, which is in the middle of a trend towards slimline design and large size.

It could therefore be helpful to provide a white reflective film capable of improving the luminance and unevenness therein, avoiding uneven close contact with, and scraping of, the light guide plate, and minimizing the crushing of convexes formed on at least one side of it, even in cases where the reflective film is laid directly over a corrugated chassis designed to house circuitry, etc. or the reflective film is used in combination with LEDs.

SUMMARY

We thus provide:
  (1) A white reflective film for an edge light backlight which satisfies items (i) to (iii) below:
    (i) It has a stiffness of 2 to 10 mN·m.
    (ii) Convexes have been formed on at least one face (A), and their maximum height is 5 to 60 μm.
    (iii) The above convexes contain an aromatic polyester.
  (2) A white reflective film for an edge light backlight which satisfies items (i) to (iii) below:
    (i) It has a stiffness of 2 to 10 mN·m.
    (ii) Convexes have been formed on at least one face (A), and their maximum height is 5 to 60 μm.
    (iii) The above convexes contain polypropylene.
  (3) A white reflective film for an edge light backlight described in (1) or (2) above wherein the above convexes have been obtained through compression molding.

(4) A white reflective film for an edge light backlight described in (1) above wherein the above convexes have been obtained through compression molding and the above aromatic polyester contains a polyethylene terephthalate copolymer comprising an isophthalic acid component as a copolymerization component.

(5) A white reflective film for an edge light backlight described in any of (1) to (4) above wherein the above convexes have an area of 0.5 to 3 mm².

(6) An LCD backlight which features a white reflective film for an edge light backlight described in any of (1) to (5) above and a light source containing light emitting diodes and is 76.2 cm (30 inches) or more in size.

(7) An LCD backlight described in (6) above which further features a light guide plate with surface concaves or convexes 5 μm or more in depth or height and in which the above white reflective film for an edge light backlight is placed such that the convexes on the above surface (A) face this light guide plate.

Our white reflective films are particularly advantageous in improving the unevenness in luminance of an edge light backlight by setting its stiffness within a certain range, forming convexes of a certain size at least on one surface (A) (the reflective side during use, the side facing the light guide plate), and containing an aromatic polyester in these convexes. Our white reflective films are advantageous when used for edge light backlights with LED light sources and illumination light sources (particular backlights 76.2 cm (30 inches) or more in size) as it can reduce unevenness in luminance better than has been possible so far.

EXPLANATION OF NUMERICAL SYMBOLS

Figure 1:
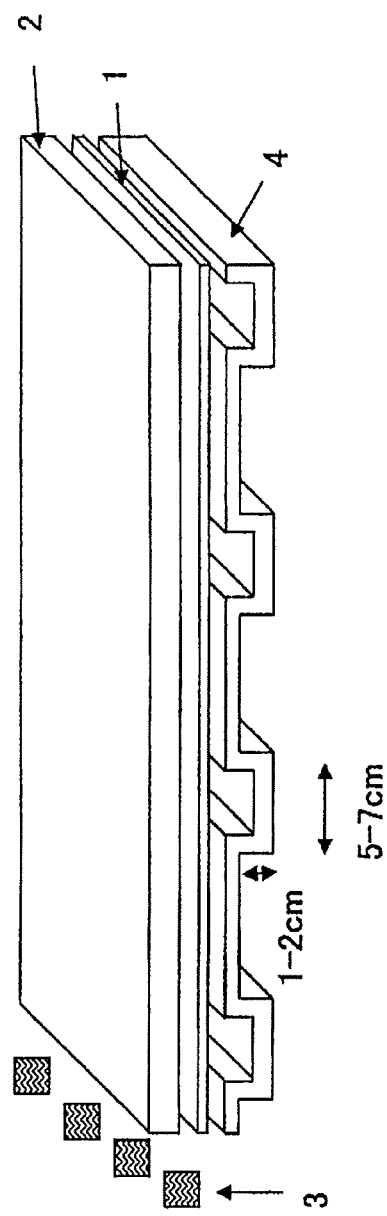
FIG. 1: A schematic diagram illustrating an example of our film for a large edge light backlight with an LED light source.

1 White reflective film
2 Light guide plate
2a Convex
3 Light emitting diode (LED)
4 Rear chassis
5 Loading equipment (ink blocking tester)
6 Stage
7 Load spring
8 Load screw
9 Stainless steel plate
10 Stainless steel ruler

DETAILED DESCRIPTION

We discovered that when the white reflective film has a stiffness of a certain range, convexes with a maximum height of a range size at least on one surface (A), and a certain chemical composition in these convexes.

In this regard, unevenness in luminance means any kind of unevenness in luminance specified below, as visually observed when a backlight is switched on:

(i) Streaky unevenness
(ii) Patchy unevenness
(iii) Local darkening.

White spotting means the appearance of any elliptical bright area with a major axis of less than 5 cm, as visually observed when a backlight is switched on.

Our white reflective films will now be described in detail below.

Basic Configuration of White Reflective Film
Stiffness of White Reflective Film

The white reflective film has a stiffness of 2 to 10 mN·m, preferably 3 to 10 mN·m. If the stiffness is less than 2 mN·m, the unevenness in luminance of an edge light backlight becomes large. Conversely, if the stiffness exceeds 10 mN·m, the white reflective film is prone to retain a curl after being paid out from a reel, giving rise to the risk of a large unevenness in luminance. It also degrades the productivity of the formation of surface convexes on the base film through compression hot molding.

The measurement method for the stiffness of the white reflective film is as described below:

(i) Measurements are carried out in accordance with JIS P8125 (2000) under environmental conditions of 23° C. and 50% RH using a STIFFNESS TESTER V5, manufactured by TARBER INSTRUMENT Corp.

(ii) Three measurements are taken in each of the two directions corresponding to the reflective and non-reflective sides of the white reflective film, with the average of the measurements designated as the "stiffness."

Convexes on Reflective-Side Surface

The white reflective film has convexes on at least one side (the reflective-side surface, hereinafter referred to as "surface (A)"). The maximum height of such convexes is 5 to 60 μm, preferably 10 to 50 μm, and most preferably 30 to 50 μm. If it is less than 5 μm, the unevenness in luminance of an edge light backlight becomes large. If, on the other hand, it is larger than 60 μm, the air bubbles inside the white reflective film to be described later burst, leading to a reduction in luminance due to a deterioration in reflective performance.

The measurement method for the maximum height of convexes is as described below:

(i) A 5 cm-square piece is cut from the white reflective film for use as a sample.

(ii) The sample is observed using a laser microscope, model VK-9700 manufactured by Keyence Corporation, with the magnification of its object lens set to 20×, and any portion detected at a height of 1 μm or more is identified as a convex and targeted for measurement.

(iii) An arbitrarily chosen area (2 cm×2 cm) on the convex-featuring surface of the sample is subjected to height calculations based on the profiling function of the attached analysis software, and the maximum value is taken from the measured heights.

(iv) The above measurement is repeated on a total of five randomly selected samples, with the number average of the measurements (maximum values) designated as the "maximum height of convexes."

Aromatic Polyester in Convexes

The convexes of the white reflective film contain an aromatic polyester. The presence of an aromatic polyester helps the above convexes form well, thereby reducing the chances of white spotting occurring.

An aromatic polyester is synthesized from a dicarboxylic acid component and a diol component. Examples of a dicarboxylic acid include terephthalic acid, isophthalic acid, 2,6-naphthalene dicarboxylic acid, 4,4'-diphenyl dicarboxylic acid, adipic acid, and sebacic acid. Examples of a diol include ethylene glycol, 1,4-butanediol, 1,4-cyclohexanedimethanol, and 1,6-hexanediol.

Of these aromatic polyesters, polyethylene terephthalate is preferable, more preferably a copolymerized polyethylene terephthalate containing an isophthalic acid component as a copolymerization component. The presence of an isophthalic acid component helps the above convexes form well during compression molding, thereby reducing the chances of white spotting occurring.

Though there are no specific restrictions on the aromatic polyester content of convexes, it is preferable that an aromatic polyester account for 30 mass % or more of convexes, more preferably 50 mass % or more, and even more preferably 70 mass % or more. The upper limit is 100 mass %.

Polypropylene in Convexes

The convexes of the white reflective film may contain polypropylene in place of the above aromatic polyester. As with the case of an aromatic polyester, the presence of polypropylene helps the above convexes form well, thereby reducing the chances of white spotting occurring.

When polypropylene is contained, convexes with the above characteristic also form well during compression molding, thereby reducing the chances of white spotting occurring.

Though there are no specific restrictions on the polypropylene content of convexes, it is preferable that polypropylene account for 30 mass % or more of convexes, more preferably 50 mass % or more, and even more preferably 70 mass % or more. The upper limit is 100 mass %.

Convex Area

It is preferable that the area of an individual convex formed on surface (A) of the white reflective film be 0.5 to 3 mm$^2$ in size. If it is larger than 3 mm$^2$, significant white spotting is sometimes observed. If it is designed to be less than 0.5 mm$^2$ prior to the molding of convexes, the maximum height of convexes is prone to be less than 5 μm, and this sometimes gives rise to unevenness. Convexes with areas in the above range may easily be formed, particularly through compression molding.

The measurement method for the area of an individual convex is as described below:
 (i) A 5 cm-square piece is cut from the above white reflective film for use as a sample.
 (ii) The sample is observed using a laser microscope, model VK-9700 manufactured by Keyence Corporation, with the magnification of its object lens set to 20×, and any portion detected at a height of 1 μm or more is identified as a convex and targeted for measurement.
 (iii) The images of convexes are analyzed using the profiling function of the attached analysis software. If a convex has an elliptical shape, the major and minor axes, as well as the product of the two, are calculated, while, if a convex has a rectangular shape, the product of the long and short sides is calculated. If a convex has a shape other than those, the area of the smallest of the rectangles that circumscribes it is calculated.
 (iv) The above measurement is repeated on a total of five randomly selected samples, with the number average of the measurements designated as the "convex area."

Basic Manufacturing Method for White Reflective Film

The white reflective film for an edge light backlight as described above may be manufactured using, for instance, any of the methods described below. Of them, it is preferable that the method described in (II) be used to maximize the productivity and advantageous effect.

(I) Producing a white reflective film with the above characteristics by applying a certain resin layer or coating layer onto both or one side of a base white film and compression-molding such a layer.
 (II) Producing a white reflective film with the above characteristics by, when producing a base white film via melt-extrusion, employing a special material and compression-molding such a material.
 (III) Producing a white reflective film with the above characteristics by mixing the methods described in (I) and (II) above.

Under the above basic manufacturing methods, methods to keep individual characteristics within their respective desired ranges are available as described below.

Stiffness Control Method

The following are examples of a method to control the stiffness of the white reflective film within the above range, though they are not limited thereto:
 (i) Controlling the stiffness by designing the thickness of the white reflective film within, for instance, 200 to 450 μm.
 (ii) Controlling the stiffness by giving a two or three-layer structure incorporating a layer that does not contain air bubbles to be described later to the white reflective film and adjusting the thickness of such a layer.

Method to Form Convexes on White Reflective Film

It is preferable that, when manufacturing a white reflective film, convexes be obtained through compression molding. More specifically, it is preferable that convexes be molded by first putting a film produced by applying a certain resin layer or coating layer onto both or one side of a base white film or a base white film produced via melt-extrusion using a special material through a 250° C. to 400° C. preheating step based on a heating cylinder or infrared heater and then subjecting it to a compression step based on mold rolls on which a convex pattern has been engraved. The preheat temperature may preferably be 270 to 350° C. and more preferably 280 to 320° C. If it is less than 250° C., convexes with adequate heights cannot sometimes be formed due to poor moldability. If, on the other hand, it exceeds 400° C., the shrinkage of the film becomes significant, particularly in the width direction, while the energy cost increases.

It is possible to produce a white reflective film with excellent dimensional stability by adjusting the tension in the above preheating step. The preferable range of tension applied in the preheating step is 50 to 200 N/m, more preferably 50 to 150 N/m, and even more preferably 70 to 120 N/m. If it is less than 50 N/m, film conveyability sometimes becomes poor. If, on the other hand, it exceeds 200 N/m, the shrinkage rate in the film length direction sometimes stays high, leading to poor dimensional stability.

It is preferable that the pressure applied by mold rolls be 1000 to 2500 MPa, more preferably 1500 to 2200 MPa. If it is less than 1000 MPa, convexes with adequate heights sometimes cannot be formed due to poor moldability. If, on the other hand, it exceeds 2500 MPa, the flatness of the film sometimes degrades, while the air bubbles inside the white reflective film to be described later burst, leading to a reduction in luminance.

White Film to be Used as Base Material

It is preferable that the visible light reflectance of any white film to be used as base material be as high as possible when used as a reflective film for an LCD backlight or illumination light source. For this reason, a film containing air bubbles and/or incompatible particles, more specifically a white thermoplastic resin film, is preferably used as the base white film. As such a white thermoplastic resin film, a porous unstretched or biaxially stretched polypropylene film, porous unstretched or stretched polyethylene terephthalate film, aliphatic polyester-based film, and other polyolefin or polyester-based films are preferably used, though they are not limited thereto. From a moldability or productivity viewpoint, in particular, polyester-based films are preferably used.

Manufacturing methods and facts about such white thermoplastic resin films have been disclosed in detail in Japanese Unexamined Patent Publication (Kokai) No. HEI-8-262208, Official Gazette, paragraphs [0034] to [0057], Japanese Unexamined Patent Publication (Kokai) No. 2002-90515, Official Gazette, paragraphs [0007] to [0018], and so on.

Of them, the porous white biaxially stretched polyethylene terephthalate film disclosed in Japanese Unexamined Patent Publication (Kokai) No. 2002-90515, Official Gazette, can be particularly advantageously applied as a base white film for the above reasons. Further, from the viewpoint of heat resistance and reflectance, a porous white biaxially stretched polyethylene terephthalate film containing polyethylene naphthalate as a mixed and/or copolymerized component is preferable, particularly a porous white biaxially stretched polyethylene terephthalate film containing inorganic particles to improve the fire retardance of the white thermoplastic resin film itself.

It is preferable that the inorganic particle content of the white thermoplastic resin film be 2 mass % or more with respect to the total mass of the white thermoplastic resin film, more preferably 7 mass % or more, even more preferably 10 mass % or more, and most preferably 15 mass % or more. Though there are no specific restrictions on the upper limit, it is preferable that the inorganic particle content be 80 mass % or less, as this makes it possible to prevent the film's susceptibility to tearing during film production, a problem associated with a higher content, while still being able to easily obtain the above fire retardant effect.

There are no specific restrictions on the structure of the base white film, and it may be selected as appropriate according to the purpose of use or required characteristics. Specific examples include a single-layer film and a multi-layer composite film, and it is preferable that at least one of the layers contain air bubbles and/or inorganic particles.

A single-layered film is a film comprising just one layer (hereinafter referred to as "layer A"), and this layer A contains inorganic particles and/or air bubbles.

A double-layered film is a film with a layer A/layer B configuration, comprising the above layer A and a second layer laminated thereon, layer B, and at least one of layer A and layer B contain inorganic particles and/or air bubbles. It is preferable that the inorganic particle content be 2 mass % or more with respect to the total mass of the base white film, namely the combined mass of the two layers, more preferably 7 mass % or more, even more preferably 10 mass % or more, and most preferably 15 mass % or more.

A triple-layered film is a film with a three layer configuration such as layer A/layer B/layer A or layer A/layer B/layer C, and at least one of the three layers contain inorganic particles and/or air bubbles. It is preferable that, as with the case of a double-layered film, the inorganic particle content be 2 mass % or more with respect to the total mass of the base white film, more preferably 7 mass % or more, even more preferably 10 mass % or more, and most preferably 15 mass % or more. It is most preferable that, in the case of a three layer configuration, the layer containing air bubbles be the above layer B (middle layer) from the viewpoint of productivity.

When forming convexes using the method described in (II) above, it is necessary that at least one surface of the white reflective film used as base material contain aromatic polyester and/or polypropylene. More specifically, it is necessary that, in the case of a single layer configuration, layer A contain an aromatic polyester and/or polypropylene, that, in the case of a double-layered film, at least either of layer A or layer B contain an aromatic polyester and/or polypropylene, and that, in the case of a triple-layered film as described above, at least either of layer A or layer C contain an aromatic polyester and/or polypropylene.

It is preferable that the number average particle diameter of inorganic particles, advantageously contained in a white film to be used as base material for a white reflective film for an edge light backlight, be 0.3 to 2.0 μm.

As such inorganic particles, calcium carbonate, magnesium carbonate, zinc carbonate, titanium oxide, zinc oxide, cerium dioxide, magnesium oxide, barium sulfate, zinc sulfate, calcium phosphate, silica, alumina, mica, mica titanium, talc, clay, kaolin, lithium fluoride, calcium fluoride, and the like may be used. Of them, barium sulfate and titanium oxide are preferable from the viewpoint of light resistance, film production efficiency and economic efficiency.

Next, a manufacturing method for the above white thermoplastic resin film, when the white film to be used as base material for a white reflective film for an edge light backlight is a triple-layered white thermoplastic resin film, will be described. However, this disclosure is not limited to this example.

First, polymethylpentene, as an incompatible polymer, and a copolymer of polyethylene glycol, polybutylene terephthalate and polytetramethylene glycol, as a specific gravity lowering agent, are mixed into polyethylene terephthalate. After through mixing and drying, the mixture is fed to an extruder B, which has been heated to a temperature of 270 to 300° C. Polyethylene terephthalate containing $BaSO_4$, $CaCO_3$, $TiO_2$ and other inorganic substances and/or organic substances as additives is fed to an extruder A using an ordinary method. After ensuring that the extruder B polymer and extruder A polymer go into the middle layer (layer B) and two outer layers (layers A), respectively, of the triple-layer T-die, a triple-layered melt laminated sheet with a layer A/layer B/layer A configuration is extruded.

It is preferable that an aromatic polyester and/or polypropylene, more preferably a copolymerized polyethylene terephthalate containing an isophthalic acid component as a copolymerization component, be used for the layers that form reflective-side surface (A) (layers A in the above layer A/layer B/layer A configuration). The use of a copolymerized polyethylene terephthalate containing an isophthalic acid component as a copolymerization component makes it possible to not only improve moldability and productivity but enhance the white spotting prevention effect.

This melt laminated sheet is cooled and solidified through electrostatically achieved close contact with a drum that has been cooled to a surface temperature of 10 to 60° C. to obtain an unstretched film. This unstretched film is then led to a group of rolls that has been heated to 80 to 120° C. and longitudinally drawn to increase its length 2.0 to 5.0-fold, followed by cooling via a group of rolls set to 20 to 50° C. Next, this longitudinally drawn film is guided to a tenter, as its two ends are held with clips, and transversely drawn in an atmosphere heated to 90 to 140° C. to stretch it in the direction perpendicular to the length direction. In this case, the draw ratio is 2.5 to 4.5 both longitudinally and transversely, and it is preferable that the area draw ratio (longitudinal draw ratio×transverse draw ratio) be 9 to 16. If the area draw ratio is less than 9, the whiteness of the obtained film tends to be unsatisfactory. If, on the other hand, the area draw ratio exceeds 16, the film becomes susceptible to tearing during stretching, giving rise to a tendency towards unsatisfactory film production efficiency. To give flatness and dimensional stability to the biaxially stretched film, it is subjected to a heat setting process at 150 to 230° C. inside a tenter, followed by uniform and gradual cooling. After cooling down to room temperature, the film is taken up on a take-up machine to obtain a white thermoplastic resin film for use as base material. It is preferable that the thickness of any white film to be used as base material be designed to be within, for instance, the 200 to 450 µm range. This makes it easier to control the stiffness of the white reflective film obtained in the end within the above range.

A few white film products are available for use as base material. Examples of a single-layered base white film include "Lumirror" (registered trademark) E20 (manufactured by Toray Industries, Inc.) and SY64, SY74 and SY80 (manufactured by SKC). Examples of a double-layered base white film include "Tetron" (registered trademark) film UXZ1, UXSP and UXG (manufactured by Teijin DuPont Films Japan Ltd.), while examples of a triple-layered base white film include "Lumirror" (registered trademark) E6SL, E6SR and E6SQ (manufactured by Toray Industries, Inc.), "Tetron" (registered trademark) film UX, UXH, UXS7, UXG7 and UXE (manufactured by Teijin DuPont Films Japan Ltd.), "MCPET" (registered trademark, Furukawa Electric Co., Ltd.) "Lumirex", and "Lumirex II" (Mitsubishi Plastics, Inc.).

Applications of White Reflective Film

The white reflective film is designed for edge light backlights, and can be particularly advantageously used for edge light LCD backlights and planar light sources to illuminate billboards, vending machines, and the like.

It can also be advantageously used for reflecting plates that form part of various planar light sources and as sealing films and back sheets for solar cell modules, which are required to have good reflective characteristics. Other applications include base materials for paper replacement products such as cards, labels, seals, delivery slips, video printer image receiving sheets, image receiving sheets for inkjet and bar code printers, posters, maps, dust-free sheets, noticeboards, whiteboards, and image receiving sheets for thermosensitive transfer printing, offset printing and various printing records, including telephone cards and IC cards, as well as wallpaper and other building materials, indoor and outdoor lighting equipment, indirect lighting equipment, parts mounted on automobiles, railroad vehicles, aircraft and the like, and electronic parts such as circuit materials.

Edge Light Backlight

Configuration of Edge Light Backlight

The white reflective film is advantageously used for edge light backlights. An edge light backlight is typically produced by placing a white reflective film and a light guide plate into a corrugated chassis in that order, making sure that the above surface (A) of the white reflective film faces the light guide plate. Along the edges of the light guide plate, LEDs or other light sources are mounted. In addition, a diffusion plate, prism, and the like may be placed on the front surface of the light guide plate (opposite side to the white reflective film).

The use of the white reflective film for such an edge light backlight makes it possible to produce high-quality backlights that minimize unevenness in luminance and reduce the scraping of the light guide plate. In particular, with television edge light backlights using an LED light source, which have been undergoing rapid technical advances in recent years, the white reflective film makes it possible to produce high-quality backlights with high production yields, despite their large backlight areas, as it is resistant to curling during assembly or warping due to heat dissipated by the LED light source.

To effectively bring out the advantageous effect, an LCD backlight using light emitting diodes (LEDs) as a light source needs to be 76.2 cm (30 inches) or more in size (diagonal length), preferably 88.9 cm (35 inches) or more, more preferably 101.6 cm (40 inches) or more, and most preferably 127 cm (50 inches) or more. The upper limit may be around 203.2 cm (80 inches) though there are no specific restrictions.

Light Guide Plate

The advantageous effect of the white reflective film is more effectively brought out when the light guide plate of an edge light backlight has concaves or convexes 5 µm or more in depth or height on its surface. If concaves or convexes 10 µm or more in depth or height are provided, the advantageous effect is even more pronounced. There are no specific restrictions on the upper limit of the depth or height of concaves or convexes provided on the surface of a light guide plate, it is preferable that it be 100 µm or less as this ensures that the advantageous effect is significantly exhibited. More preferably, the value may be 60 µm or less.

Figure 2:
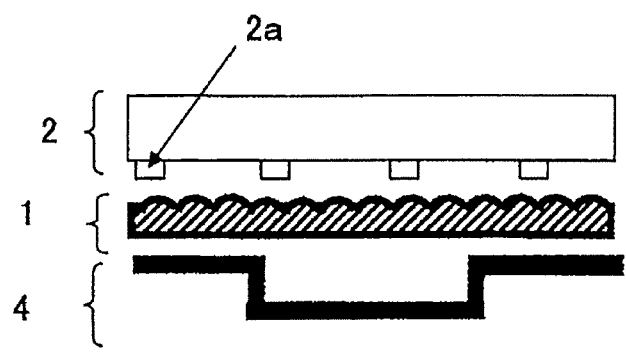
FIG. 2: A schematic diagram illustrating the relationship between a light guide plate with convexes, a white reflective film and a rear chassis.

Above all, a light guide plate prepared by dot-printing convexes on an acrylic plate (3 to 4 mm thick), as illustrated in FIG. 2, and one featuring concaves formed using the UV transfer method are preferable in terms of production capacity. A light guide plate having concaves formed through laser processing is also preferable in that backlight brightness is high and that the risk of the light guide plate being scraped by the white reflective film is low.

Further, it is preferable that the maximum height of convexes formed on at least one surface of the white reflective film be larger than the concaves or convexes present on the surface of the light guide plate. This makes it possible to further reduce the unevenness in luminance in the backlight. It is postulated that this is attributable to the existence of a correlation between the close contact between the light guide plate and the white reflective film, on the one hand, and the unevenness in luminance, on the other, and convexes formed on at least one surface of the base white film are believed to be playing the role of a spacer that suppresses unevenness in luminance.

It is preferable that the light guide plate be placed such that it faces the convexes on the white reflective film. As illustrated in FIG. 2, the irregular surfaces of the light guide plate 2 and the white reflective film 1 create an air layer between the light guide plate and the white reflective film, and this allows the light to spread uniformly, thus providing an even backlight. If the light guide plate is placed such that it faces the surface of the white reflective film 1 opposite the one featuring convexes, the light guide plate and the white reflective film are brought into close contact, and this sometimes gives rise to unevenness in luminance.

In this regard, the surface concaves or convexes of the light guide plate is calculated in the following manner:

(i) The light guide plate is cut into 5 cm-square pieces, and five randomly selected pieces are taken out as samples.

(ii) Each sample is observed using a laser microscope, model VK-9700 manufactured by Keyence Corporation, with the magnification of its object lens set to 20×, and any portion detected at a height or depth of 1 µm or more is identified as a convex or concave, with its height or depth calculated using the profiling function of the attached analysis software.

(iii) The number average of the measurements taken of the five randomly selected samples are designated as the "surface concaves or convexes of the light guide plate."

EXAMPLES

Our films and backlights will be described in more detail below using examples, but this disclosure is not limited by these examples. Measurement and evaluation methods are described first.

(1) Stiffness of White Reflective Film
  (i) Measurements were carried out in accordance with JIS P8125 (2000) under environmental conditions of 23° C. and 50% RH using a STIFFNESS TESTER V5, manufactured by TARBER INSTRUMENT Corp.
  (ii) Three measurements were taken in each of the two directions corresponding to the reflective and non-reflective sides of the sample, and the average of the measurements was designated as the "stiffness."

(2) Maximum Height of Convexes on White Reflective Film
  (i) A 5 cm-square piece was cut from the white reflective film for use as a sample.
  (ii) The sample was observed using a laser microscope, model VK-9700 manufactured by Keyence Corporation, with the magnification of its object lens set to 20×, and any portion detected at a height of 1 µm or more was identified as a convex.
  (iii) An arbitrarily chosen area (2 cm×2 cm) on the convex-featuring surface of the sample was subjected to height calculations based on the profiling function of the attached analysis software, and the maximum value was taken from the measured heights.
  (iv) The above measurement was repeated on a total of five randomly selected samples, with the number average of maximum values designated as the "maximum height of convexes."

(3) Aromatic Polyester in Convexes on White Reflective Film
  (i) A 5 cm-square piece was cut for use as a sample, and convexes were gouged out with a cutter to a depth of 1 µm from the surface.
  (ii) Next, the scraped-off bit of the sample was dissolved in a mixed solution of hexafluoroisopropanol-d2 and deuterated chloroform, and the supernatant liquid was taken as the measurement sample.
  (iii) Measurements were carried out via $^1$H-NMR spectroscopy. When a 7.6 ppm signal was detected, it was judged that an isophthalic acid component was contained.
  (iv) The above measurements were repeated on a total of five randomly selected samples.

(4) Area of Convex on White Reflective Film
  (i) A 5 cm-square piece was cut for use as a sample.
  (ii) The sample was observed using a laser microscope, model VK-9700 manufactured by Keyence Corporation, with the magnification of its object lens set to 20×, and any portion detected at a height of 1 µm or more was identified as a convex.
  (iii) The images of convexes were analyzed using the profiling function of the attached analysis software. When a convex had an elliptical shape, the major and minor axes, as well as the product of the two, were calculated, while, when a convex had a rectangular shape, the product of the long and short sides was calculated. When a convex had a shape other than those, the area of the smallest of the rectangles that circumscribed it was calculated.
  (iv) The above measurement was repeated on a total of five randomly selected samples, with the number average of the measurements designated as the "convex area."

Figure 3:
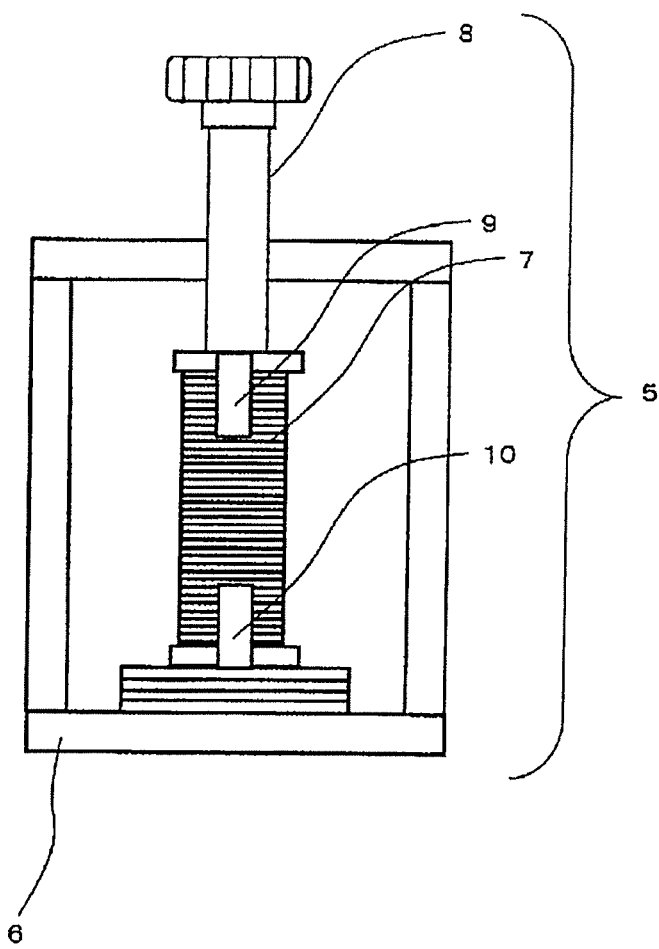
FIG. 3: A schematic diagram illustrating the measuring equipment used to evaluate the crushing of convexes on a white reflective film.

(5) Crushing of Convexes on White Reflective Film
  (i) A 40-inch LCD television (KDL-40 EX 700 manufactured by Sony Corporation) was disassembled, and an edge light backlight having an LED as a light source (backlight B) was taken out. The light emitting surface of the backlight B was 89.0 cm×50.2 cm in size with a diagonal length of 102.2 cm. Further, the light guide plate (acrylic plate, 4 mm thick with 7 µm convexes) was taken out from the backlight B, and a 5 cm-square piece was cut from the light guide plate. A 5 cm-square piece was also cut from the white reflective film for use as a test sample. The pair of 5 cm-square pieces were stacked together such that the convexes of the light guide plate and the convexes of the white reflective film faced each other.
  (ii) A 70 MPa load was then placed on the stack using a piece of equipment as illustrated in FIG. 3, and the stack was held in this state for 30 minutes. More specifically, this loading equipment was an ink blocking tester, model DG-BT, DG2020 series, manufactured by DG Engineering Co., Ltd., and the detailed procedure was as follows: First, the above stack, consisting of a light guide plate and a white reflective film (5 cm×5 cm in size) was placed on the stage 6. The load spring 7, featuring a stainless steel plate 9 attached to the top end and a stainless steel ruler 10 attached to the bottom end, was then placed on the stack, and the load screw 8 was rotated clockwise. While reading the indication on the scale of the point where the stainless steel plate attached to the top end and the stainless steel ruler attached to the bottom end met, the screw continued to be rotated until the indication reached the point that corresponded to 70 MPa according to the load conversion table. Once 70 MPa was achieved, the screw was stopped, and the equipment was held in that state for 30 minutes. After this, the screw was rotated anticlockwise to release the load, and the white reflective film was retrieved.
  (iii) The sample was observed using a laser microscope, model VK-9700 manufactured by Keyence Corporation, with the magnification of its object lens set to 20× to determine whether there was any change in the state of the convexes on the white reflective film from before to after the test described in (ii).
  (iv) The above measurement was repeated on a total of five randomly selected samples, and the results were graded according to the criteria listed below, with Grade A judged to be satisfactory:
    Grade A: The crushing of one or more convexes is not observed on any of the five white reflective film samples.
    Grade B: The crushing of one or more convexes is observed on one or two of the five white reflective film samples.

Grade C: The crushing of one or more convexes is observed on three or more of the five of the white reflective film samples.

(6) Surface Concaves or Convexes of Light Guide Plate
(i) From an LCD television, the light guide plate, located above the white reflective film, was taken out.
(ii) A 5 cm-square piece was cut from the light guide plate for use as a sample.
(iii) The sample was observed using a laser microscope, model VK-9700 manufactured by Keyence Corporation, with the magnification of its object lens set to 20×, and any portion detected at a height or depth of 1 μm or more was identified as a convex or concave.
(iv) The height or depth of each convex or concave was calculated using the profiling function of the attached analysis software.
(v) The above measurement was repeated on a total of five randomly selected samples, with the number average of the measurements designated as the "surface concaves or convexes of the light guide plate."

(7) Evaluation of Percentage Luminance Change in Backlight and Unevenness in Luminance A 17-inch LCD television (VIERA TH-L17F1 manufactured by Panasonic Corporation) was disassembled, and an edge light backlight having an LED as a light source (backlight A) was taken out. The light emitting surface of the backlight A was 37.5 cm×21.2 cm in size with a diagonal length of 43.1 cm. Further, three optical films, a light guide plate (acrylic plate, 3.5 mm thick with 12 μm convexes) and a reflective film were taken out from the backlight A. The white reflective films used in the Examples and Comparative Examples were then cut into the same shape and size as the reflective film mounted in the television, with the white films used as base materials for the above white reflective films also cut into the same size. In place of the mounted reflective film, a cut-out white reflective film was mounted in the television such that its convexes would face the light guide plate, and the light guide plate and three optical films were put back into the television in the same order and orientation as before, followed by the measurement of luminance. Next, the cut-out white reflective film was replaced with the white film used as base material, and luminance was measured in the same manner.

A 40-inch LCD television (KDL-40 EX 700 manufactured by Sony Corporation) was also disassembled, and an edge light backlight having an LED as a light source (backlight B) was taken out. The light emitting surface of the backlight B was 89.0 cm×50.2 cm in size with a diagonal length of 102.2 cm. Further, a light guide plate (acrylic plate, 4 mm thick with 7 μm convexes), a reflective film and three optical films were taken out from the backlight B. The white reflective films used in the Examples and Comparative Examples were then cut to the same shape and size as the reflective film mounted in the television, with the white films used as base materials for the above white reflective films also cut to the same size. In place of the mounted reflective film, each of the white reflective films used in the Examples and Comparative Examples (cut-out piece) was mounted in the television such that its convexes would face the light guide plate, and the light guide plate and three optical films were put back into the television in the same order and orientation as before, followed by the measurement of luminance. The same luminance measurement was repeated on the white films used as base materials for the above white reflective films by mounting each of the base white films in place of a white reflective film.

Judgment on percentage luminance change and unevenness in luminance was made as specified below. Grade A or B for both 17 and 40-inches was judged to be satisfactory, while grade C just for either 17 or 40 was judged to be unsatisfactory. To determine percentage luminance change, five randomly selected samples were taken, and the number average of their measurements were designated as such.

Percentage luminance change={(Luminance recorded when white reflective film used−Luminance recorded when white film as base material for same white reflective film used)/Luminance recorded when white film as base material for same white reflective film used}×100

A positive value means that luminance has increased compared to the white film used as base material, while a negative value means that luminance has decreased compared to the white film used as base material.

Grade A: Percentage luminance change 0.1% or more
Grade B: percentage luminance change −1.0% to 0.1%
Grade C: percentage luminance change −3.0% to −1.0%.

Next, with such backlights, judgment was made on the presence of unevenness in luminance as specified below through visual observation. Grade A or B for both 17 and 40 inches was judged to be satisfactory, while grade C just for either 17 or 40 was judged to be unsatisfactory.

Grade A: No unevenness in luminance visually recognized when observed from the frontal direction and 45° directions.
Grade B: Unevenness in luminance visually recognized when observed from an oblique) (45° direction, though not from the frontal direction.
Grade C: Unevenness in luminance visually recognized when observed from the frontal direction.

(8) Evaluation of Scraping of Light Guide Plate

A white reflective film was stacked on the light guide plate obtained when the above 40-inch LCD television was disassembled (KDL-40 EX 700 manufactured by Sony Corporation) such that convexes on the white reflective film came into contact with the light guide plate, and the reflective sheet sample was then lifted at a linear speed of 1 m/min, accompanied by a sideward movement under a load of 200 gf/cm$^2$ (0.0196 MPa). This was repeated a total of five times on the same white reflective film, and the light guide plate was visual inspected for the presence of any scrape marks that had been generated on its surface, followed by a grading evaluation as specified below. Grade A was judged to be satisfactory, while grade B was judged to be unsatisfactory.

Grade A: No scraping visible.
Grade B: Scraping visible.

(9) Evaluation of White Spotting

A 40-inch LCD television (KDL-40 EX 700 manufactured by Sony Corporation) was disassembled, and an edge light backlight having an LED as a light source (backlight B) was taken out. The light emitting surface of the backlight B was 89.0 cm×50.2 cm in size with a diagonal length of 102.2 cm. Further, a light guide plate (acrylic plate, 4 mm thick with 7 μm convexes), a reflective film and three optical films were taken out from the backlight B. The white reflective films used in the Examples and Comparative Examples were then cut to the same shape and size as the reflective film mounted in the television. In place of the mounted reflective film, each of the white reflective films used in the Examples and Comparative Examples (cut-out piece) was mounted in the television such that its convexes would face the light guide plate, and the light guide plate and three optical films were put back into the television in the same order and orientation as before, followed by the application of a pressure of 10 MPa on the light guide plate. The procedure was repeated on a total of five samples, and the samples were visually inspected for the presence of any white spots, with the results judged according to the following criteria:

Grade A: No white spotting visible on any sample.
Grade B: White spotting visible on one or two samples.
Grade C: White spotting visible on three or four samples.
Grade D: White spotting visible on all five samples.

(10) Thermal Durability of Convexes on White Reflective Film (i) The five samples evaluated in "(2) Maximum height of convex" above were left to stand at 100° C. for 24 hours. (In the description of the present evaluation, each of these samples, upon undergoing this treatment, is referred to as a "heat-treated sample.")

(ii) A heat-treated sample was observed using a laser microscope, model VK-9700 manufactured by Keyence Corporation, with the magnification of its object lens set to 20×, and any portion detected at a height of 0.3 µm or more was identified as a convex.

(iii) An arbitrarily chosen area (2 cm×2 cm) on the convex-featuring surface of the heat-treated sample was subjected to height calculations based on the profiling function of the attached analysis software, and the maximum value was taken from the measured heights. (In this regard, the above area does not need to be the same area as the one observed in"(2) Maximum height of convex on a heat-treated sample.")

(iv) The number average of the measurements (maximum values) for the five samples was designated as the "maximum height of convexes on a heat-treated sample," and thermal durability was then calculated using the formula below, with judgment made according to grades A to C specified below. (In the formula, "Maximum height of convexes" refers to the value taken of the same sample using the method described in "(2) Maximum height of convexes.")

Thermal durability (%)={(Maximum height of convexes−Maximum height of convexes on heat-treated sample)/Maximum height of convexes}×100

Grade A: 50% or more
Grade B: 30% to 50%
Grade C: Less than 30% (including cases where no convexes are present).

(11) Polyethylene in Convexes on White Reflective Film (i) A 5 cm-square piece was cut for use as a sample, and convexes were gouged out with a cutter to a depth of 1 µm from the surface of the sample and placed in an NMR tube, to which o-dichlorobenzene-$d_4$ was then added.

(ii) Next, the mixture was dissolved by setting the interior temperature of the NMR apparatus to 135° C., and $^1$H-NMR and $^{13}$C-NMR measurements were performed straightaway.

(iii) The above measurements were repeated on a total of five randomly selected samples.

Example 1

A white reflective film was obtained by passing a 300 µm-thick white film made of porous biaxially stretched polyethylene terephthalate (base white film, "Lumirror (registered trademark)" E6SQ manufactured by Toray Industries, Inc., with a layer A/layer B/layer A structure as described above, layer A containing no isophthalic component) through a preheating zone (temperature 300° C., 1 m long) and compression-molding it at a pressure of 2000 MPa and at the molding speed specified in Table 1 using metal rolls (featuring gridded indentations 1 mm$^2$ in size and 200µ deep, temperature setting 90° C.).

Examples 2 to 4

A white reflective film was obtained by carrying out compression molding in the same manner as Example 1, except that the molding speed was changed as specified in Table 1.

Example 5

A white reflective film was obtained by carrying out compression molding in the same manner as Example 1, except that the base white film was changed to a 300 µm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) and that the molding speed was changed as specified in Table 1.

Examples 6 to 9

A white reflective film was obtained by carrying out compression molding in the same manner as Example 5, except that the molding speed was changed as specified in Table 1.

Example 10

A white reflective film was obtained by carrying out compression molding in the same manner as Example 1, except that the base white film was changed to a 400 µm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) and that the molding speed was changed as specified in Table 1.

Example 11

A white reflective film was obtained by carrying out compression molding in the same manner as Example 1, except that the base white film was changed to a 400 µm-thick white film made of porous biaxially stretched polyethylene terephthalate (base white film, "Lumirror (registered trademark)" E80B, manufactured by Toray Industries, Inc., with a layer A/layer B/layer A structure as described above, layer A containing 20 parts by mass of a polyethylene terephthalate copolymer comprising an isophthalic acid component as a copolymerization component and 20 parts by mass of barium sulfate) and that the molding speed was changed as specified in Table 1.

Example 12

A white reflective film was obtained by carrying out compression molding in the same manner as Example 1, except that the base white film was changed to a 250 μm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) and that the molding speed was changed as specified in Table 1.

Example 13

A white reflective film was obtained by carrying out compression molding in the same manner as Example 9, except that the grid cell size of the metal rolls was changed to 2 mm².

Example 14

A white reflective film was obtained by carrying out compression molding in the same manner as Example 9, except that the grid cell size of the metal rolls was changed to 4 mm².

Example 15

A white reflective film was obtained by carrying out compression molding in the same manner as Example 9, except that the grid cell size of the metal rolls was changed to 5.5 mm².

Example 16

A white reflective film was obtained by carrying out compression molding in the same manner as Example 1, except that the base white film was changed to a 300 μm-thick white film made of porous biaxially stretched polyethylene terephthalate (base white film, "Lumirror (registered trademark)" E80D, manufactured by Toray Industries, Inc., with a layer A/layer B/layer A structure as described above, layer A containing 20 parts by mass of a polyethylene terephthalate copolymer comprising an isophthalic acid component as a copolymerization component and 0.9 parts by mass of silica) and that the molding speed was changed as specified in Table 1.

Example 17

A white reflective film was obtained by compression molding a 300 μm-thick white film made of polypropylene at a pressure of 200 MPa and at the molding speed specified in Table 1 using metal rolls (featuring gridded indentations 1 mm² in size and 200μ, deep, temperature setting 130° C.).

Comparative Example 1

A coating liquid was prepared by adding 5.25 g of "HALS hybrid (registered trademark)" UV-G720T (acrylic copolymer, 40 mass % solution, refractive index 1.58, manufactured by Nippon Shokubai Co., Ltd.), 3.85 g of ethyl acetate, and 0.9 g of acrylic resin particles (Sekisui Plastics Co., Ltd." "TECHPOLYMER(Registered Trademark)" MBX30, refractive index 1.49, volume average particle diameter 30 μm) together while stirring. A white reflective film with convexes was then obtained by applying this coating liquid over one side of a 300 μm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) using a metaling bar #16 and by drying it at 120° C. for 1 minute to cure it into a coat layer.

Comparative Example 2

A coating liquid was prepared by adding 5.25 g of "HALS hybrid (registered trademark)" UV-G720T (acrylic copolymer, 40 mass % solution, refractive index 1.58, manufactured by Nippon Shokubai Co., Ltd.), 3.85 g of ethyl acetate, and 0.9 g of nylon 12 resin particles (SP20, refractive index 1.53, volume average particle diameter 30 μm, manufactured by Toray Industries, Inc.) together while stirring. A white reflective film with convexes was then obtained by applying this coating liquid to one side of a 300 μm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) using a metaling bar #16 and by drying it at 120° C. for 1 minute to cure it into a coat layer.

Comparative Examples 3 to 4

A white reflective film was obtained by carrying out compression molding in the same manner as Example 5, except that the molding speed was changed as specified in Table 1.

Comparative Example 5

A white reflective film was obtained by carrying out compression molding in the same manner as Example 1, except that the base white film was changed to a 188 μm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) and that the molding speed was changed as specified in Table 1.

Comparative Example 6

A white reflective film was obtained by carrying out compression molding in the same manner as Example 1, except that the base white film was changed to a 225 μm-thick white film made of porous biaxially stretched polyethylene terephthalate (base white film, "Lumirror (registered trademark)" E6SR manufactured by Toray Industries, Inc., with a layer A/layer B/layer A structure as described above, layer A containing 20 parts by mass of a polyethylene terephthalate copolymer comprising an isophthalic acid component as a copolymerization component and 12 parts by mass of barium sulfate) and that the molding speed was changed as specified in Table 1.

Comparative Example 7

(i) A dry laminating adhesive with a solid component concentration of 20 mass % was obtained by weighing in 16 parts by mass of "Dicdry (registered trademark)" LX-903 manufactured by DIC Corporation as a dry laminating agent, 2 parts by mass of KL-75 manufactured by DIC Corporation as a curing agent and 29.5 parts by mass of ethyl acetate and stirring for 15 minutes. This adhesive was then applied over one side of a 188 μm-thick white film made of porous biaxially stretched polyethylene terephthalate ("Lumirror (registered trademark)" E6SR manufactured by Toray Industries, Inc.) using a metaling bar #16 and dried at 120° C. for 1 minute.

(ii) A high-stiffness base white film was obtained by dry-laminating a 300 μm-thick white film made of porous biaxially stretched polyethylene terephthalate ("Lumirror (registered trademark)" E6SR manufactured by Toray Industries, Inc.) and the 188 μm-thick white film from (i) via the adhesive applied over one side of the latter film.

(iii) Although this base white film was compression-molded at the same molding speed as Example 1, a wrinkling of the film occurred during molding due to a failure of the adhesive. As a result, a white reflective film could not be obtained.

TABLE 1

| | Thickness of base white film [μm] | Type of base white film | Aromatic polyester contained in convexes | Stiffness [mN · m] | Maximum height of convexes [μm] | Area of convex [mm$^2$] | Presence of isophthalic component | Molding speed [m/min.] |
|---|---|---|---|---|---|---|---|---|
| Example 1 | 300 | E6SQ | PET | 3 | 12 | 0.9 | No | 13 |
| Example 2 | 300 | E6SQ | PET | 3 | 22 | 0.9 | No | 10 |
| Example 3 | 300 | E6SQ | PET | 3 | 35 | 0.9 | No | 8 |
| Example 4 | 300 | E6SQ | PET | 3 | 45 | 0.9 | No | 5 |
| Example 5 | 300 | E6SR | PET + PET-I | 3 | 5 | 0.9 | Yes | 20 |
| Example 6 | 300 | E6SR | PET + PET-I | 3 | 12 | 0.9 | Yes | 15 |
| Example 7 | 300 | E6SR | PET + PET-I | 3 | 22 | 0.9 | Yes | 13 |
| Example 8 | 300 | E6SR | PET + PET-I | 3 | 35 | 0.9 | Yes | 10 |
| Example 9 | 300 | E6SR | PET + PET-I | 3 | 45 | 0.9 | Yes | 8 |
| Example 10 | 400 | E6SR | PET + PET-I | 7 | 45 | 0.9 | Yes | 8 |
| Example 11 | 400 | E80B | PET + PET-I | 3 | 45 | 0.9 | Yes | 9 |
| Example 12 | 250 | E6SR | PET + PET-I | 2.3 | 45 | 0.9 | Yes | 8 |
| Example 13 | 300 | E6SR | PET + PET-I | 3 | 45 | 1.5 | Yes | 8 |
| Example 14 | 300 | E6SR | PET + PET-I | 3 | 45 | 3.5 | Yes | 8 |
| Example 15 | 300 | E6SR | PET + PET-I | 3 | 45 | 5 | Yes | 8 |
| Example 16 | 300 | E80D | PET + PET-I | 3.5 | 45 | 0.9 | Yes | 8 |
| Example 17 | 300 | Biaxially stretched PP film | — | 2.3 | 45 | 0.9 | No | 1 |
| Comparative Example 1 | 300 | E6SR | — | 3 | 45 | 0.9 | No | — |
| Comparative Example 2 | 300 | E6SR | — | 3 | 45 | 0.9 | No | — |
| Comparative Example 3 | 300 | E6SR | PET + PET-I | 3 | 3 | 0.9 | Yes | 25 |
| Comparative Example 4 | 300 | E6SR | PET + PET-I | 3 | 65 | 0.9 | Yes | 3 |
| Comparative Example 5 | 188 | E6SR | PET + PET-I | 0.8 | 45 | 0.9 | Yes | 8 |
| Comparative Example 6 | 225 | E6SR | PET + PET-I | 1.5 | 45 | 0.9 | Yes | 8 |
| Comparative Example 7 | Dry-laminate of 300 μm and 188 μm | Dry-laminate of E6SR and E6SR | PET + PET-I | 11 | — | — | Yes | 13 |

(*1) PET: Polyethylene terephthalate
(*2) PET-I: Polyethylene terephthalate copolymer comprising isophthalic acid component as copolymerization component
(*3) PP: Polypropylene

TABLE 2

| | Scraping of light guide plate | Crushing of convexes Yes No | Percentage luminance change in backlight A (17-inch) | Percentage luminance change in backlight B (40-inch) | Unevenness in luminance in backlight A (17-inch) | Unevenness in luminance in backlight B (40-inch) | White spotting | Thermal durability of convexes |
|---|---|---|---|---|---|---|---|---|
| Example 1 | A | A | A | A | A | A | D | C |
| Example 2 | | | | | | | | |
| Example 3 | | | B | B | | | | |
| Example 4 | | | | | | | | B |
| Example 5 | | | A | A | | | C | C |
| Example 6 | | | | | | | | |
| Example 7 | | | | | | | | |
| Example 8 | | | B | B | | | B | B |

TABLE 2-continued

| | Scraping of light guide plate | Crushing of convexes Yes No | Percentage luminance change in backlight A (17-inch) | Percentage luminance change in backlight B (40-inch) | Unevenness in luminance in backlight A (17-inch) | Unevenness in luminance in backlight B (40-inch) | White spotting | Thermal durability of convexes |
|---|---|---|---|---|---|---|---|---|
| Example 9 | | | | | | | | A |
| Example 10 | | | | | | | | |
| Example 11 | | | | | | | | A |
| Example 12 | | | | | | | | B |
| Example 13 | | | | | | | | |
| Example 14 | | | | | | B | D | B |
| Example 15 | | | | | | | | |
| Example 16 | A | A | B | B | A | A | B | A |
| Example 17 | A | A | B | B | A | A | D | C |
| Comparative Example 1 | B | B | A | A | A | A | D | A |
| Comparative Example 2 | A | C | | | | | D | |
| Comparative Example 3 | | A | | | B | C | D | C |
| Comparative Example 4 | | | C | C | A | A | B | A |
| Comparative Example 5 | | | B | B | | | C | |
| Comparative Example 6 | | | | | | | | |
| Comparative Example 7 | — | — | — | — | — | — | — | — |

All our white reflective films from Examples 1 to 17 were satisfactory in terms of the scraping of the light guide plate, crushing of convexes on the white reflective film, and percentage luminance change in backlight and unevenness in luminance.

However, when the convex area exceeded 3.0 mm², white spotting performance tended to deteriorate (Examples 14 and 15). White spotting performance were better when convexes contained barium sulfate by 15 mass % or more (Example 11).

Some Examples involving convexes that contained a polyethylene terephthalate copolymer comprising an isophthalic acid component as a copolymerization component allowed the molding speed to shorten compared to those not involving such convexes for the same maximum height of convexes, thus offering better productivity. Those Examples also excelled in white spotting performance, assuming the same maximum height of convexes (cross-comparison of Examples 1 to 4 and Examples 6 to 9).

In addition to the scraping of the light guide plate, crushing of convexes on the white reflective film, and percentage luminance change in backlight and unevenness in luminance, some Examples involving convexes that contained a polyethylene terephthalate copolymer comprising an isophthalic acid component as a copolymerization component also excelled in thermal durability (Examples 8 to 16), which is desirable given that, when an LED light source is used, areas around LEDs are known to heat up to some 100° C.

In contrast, when the composition of convexes was changed to an acrylic resin alone, while keeping the stiffness and the maximum height of convexes unchanged, the scraping of the light guide plate occurred, while the crushing of convexes on the white reflective film was also observed (Comparative Example 1). When convexes were formed from nylon resin particles, the crushing of convexes on the white reflective film was observed, though the result for the scraping of the light guide plate was good (Comparative Example 2). When the maximum height of convexes was set below 5 µm, while keeping the aromatic polyester content of convexes and stiffness unchanged, the unevenness in luminance deteriorated (Comparative Example 3). When, on the other hand, the maximum height of convexes was set above 60 µm, luminance decreased (Comparative Example 4).

When the stiffness was set below 2 mN·m, while keeping the aromatic polyester content and maximum height of convexes unchanged, unevenness in luminance deteriorated with edge light backlights 30 inches or more in size (Comparative Examples 5 and 6). Conversely, when the stiffness was set above 10 mN·m, productivity during hot forming deteriorated, and a white reflective film could not be obtained (Comparative Example 7).

The invention claimed is:

1. A white reflective film for an edge light backlight which satisfies (i) to (iv):
   (i) a stiffness of 3 to 10 mN·m;
   (ii) compression molded convexes formed on at least one face (A) and having a maximum height of 30 to 60 µm, wherein the height is measured from a flat exit face of the reflective film to a top of the convexes,
   (iii) the convexes contain an aromatic polyester and wherein each of the convexes have an area of 0.5 to 3 mm²; and
   (iv) a thickness of 300 pm to 450 µm.

2. A white reflective film for an edge light backlight which satisfies (i) to (iv):
   (i) a stiffness of 3 to 10 mN·m
   (ii) compression molded convexes formed on at least one face (A) and having a maximum height of 30 to 60 µm, wherein the height is measured from a flat exit face of the reflective film to a top of the convexes,
   (iii) the convexes contain polypropylene and wherein each of the convexes have an area of 0.5 to 3 mm²: and
   (iv) a thickness of 300 pm to 450 µm.

3. The white reflective film described in claim 1, wherein the aromatic polyester contains a polyethylene terephthalate copolymer comprising an isophthalic acid component as a copolymerization component.

4. An LCD backlight comprising the white reflective film described in claim 1 and a light source containing light emitting diodes and is 76.2 cm (30 inches) or more in size.

5. The LCD backlight described in claim 4, further comprising a light guide plate with surface concaves or convexes 5 pm or more in depth or height and in which the white reflective film is arranged such that the convexes on a surface (A) face the light guide plate.

6. An LCD backlight comprising the white reflective film described in claim 2 and a light source containing light emitting diodes and is 76.2 cm (30 inches) or more in size.

7. An LCD backlight comprising the white reflective film described in claim 3 and a light source containing light emitting diodes and is 76.2 cm (30 inches) or more in size.

\* \* \* \* \*